United States Patent [19]

Steinbach et al.

[11] Patent Number: 5,217,633

[45] Date of Patent: * Jun. 8, 1993

[54] LOW-TEMPERATURE LUBRICATING OIL

[75] Inventors: Hans-Horst Steinbach, Lindlar; Jürgen Ackermann, Bergisch Gladbach; Ottfried Schlak, Cologne, all of Fed. Rep. of Germany

[73] Assignee: Bayer Aktiengesellschaft, Leverkusen, Fed. Rep. of Germany

[*] Notice: The portion of the term of this patent subsequent to Apr. 4, 2006 has been disclaimed.

[21] Appl. No.: 367,059

[22] Filed: Jun. 14, 1989

[30] Foreign Application Priority Data

Jun. 25, 1988 [DE] Fed. Rep. of Germany ....... 3821568

[51] Int. Cl.$^5$ .............. C10M 107/50; C10M 107/38; C09K 5/00; C08G 77/24
[52] U.S. Cl. .................... 252/49.6; 252/68; 528/42; 556/454
[58] Field of Search ............. 252/49.6, 68; 528/4; 556/454

[56] References Cited

U.S. PATENT DOCUMENTS

| | | | |
|---|---|---|---|
| 3,148,201 | 9/1964 | Fassnacht | 252/49.6 |
| 3,293,180 | 12/1966 | Axworthy | 252/49.6 |
| 3,503,926 | 3/1970 | Saylor | 260/46.5 |
| 3,634,246 | 1/1972 | Quaal | 252/49.6 |
| 3,642,626 | 2/1972 | Christian | 252/49.6 |
| 3,702,823 | 11/1972 | Kim | 252/49.6 |
| 3,714,044 | 1/1973 | Kim | 252/49.6 |
| 3,847,961 | 11/1974 | Koshar | 252/49.6 |
| 4,324,671 | 4/1982 | Christian et al. | 252/49.6 |
| 4,537,677 | 8/1985 | Keil | 252/49.6 |
| 4,582,620 | 4/1986 | Mori et al. | 252/49.6 |
| 4,818,423 | 4/1989 | Steinbach et al. | 252/49.6 |
| 4,824,983 | 4/1989 | Fink et al. | 252/49.6 |

FOREIGN PATENT DOCUMENTS 2019427 10/1979 United Kingdom .
2086922 5/1982 United Kingdom .

*Primary Examiner*—Jerry Johnson
*Attorney, Agent, or Firm*—Connolly and Hutz

[57] ABSTRACT

Low temperature lubricating oils are fluorosiloxane compounds of the formula $$T_a M_b D^F_c D_d$$

wherein
T represents phenyl trisiloxy groups or mixed phenyl trisiloxy-and alkyl trisiloxy groups;
M represents trialkyl monosiloxy groups triphenyl monosiloxy groups or tri-alkyl/phenol-monosiloxy groups;
D represents dialkyl disiloxy groups, diphenyl disiloxy groups, or phenyl-alkyl disiloxy groups and;
$D^F$ represents disiloxy groups with a methyl or phenyl substituent and a fluorinated substituent of the formula $C_n F_{2n+1} —CH_2—CH_2—$;
a is a number from 0 to 5;
b is a number from 3 to 7;
c is a number from 3 to 7;
d is a number from 30 to 70; and
n is a number from 1 to 12.

5 Claims, No Drawings

LOW-TEMPERATURE LUBRICATING OIL

This invention relates to a low-temperature lubricating oil based on fluorosiloxanes.

BACKGROUND OF THE INVENTION

Industrial refrigeration at low temperatures of the order of $-110°$ C. has expanded considerably in recent years. A considerable proportion of this is for laboratory equipment, cryostats and test chambers for the testing of materials at low temperatures. However, refrigeration plants for the temperature range mentioned are being increasingly used in medicine, chemistry and process engineering and also in the refining of steel and, in addition, are required for relatively high outputs.

Simple mineral oils or normal naphthenic oils have long been used as lubricants in refrigeration plants although they have been unsatisfactory in many respects (no extreme temperature stability, highly variable viscosity).

Semisynthetic oils, fully synthetic aromatic alkyl compounds, poly-α-olefins, provided further improvements. Synthetic liquid lubricants on a chemical basis, which were a move away from mineral oil, for example butyl esters of polysilicic acids, were the outcome of this development. However, liquid lubricants of the type in question show a certain sensitivity to hydrolysis which, on contact with water, can cause the lubricant to gel.

Using organopolysiloxanes as lubricants would be one way of avoiding sensitivity to hydrolysis. However, it is generally known that dimethyl polysiloxanes for example are basically poor lubricants although their viscosity temperature behavior could offer advantages for a liquid lubricant in low-temperature plants.

Although phenyl-, halophenyl- and trifluoropropyl-substituted siloxanes have good lubricating properties, they show poor viscosity temperature behavior compared with dimethyl polysiloxanes (cf. J. of Chem. and Engng. Data 6 (1961), 155). Although siloxanes such as these were used in the production of high-temperature lubricating greases, they were never used as low-temperature lubricants.

U.S. Pat. No. 3,642,626 also describes lubricants which are stable over a very wide temperature range. The lubricants in question are polymeric fluorosilicones having relatively high degrees of polymerization which, on account of their high viscosity at low temperatures, afford no improvement as low-temperature lubricants. In addition, their production is complicated and expensive.

To counteract this problem, DE-OS 27 50 980 proposes a fluorine-containing siloxane corresponding to the following general formula $$R_FR_2SiOSiR_2R_F$$

in which $R_F$ represents the group $C_nF_{2n+1}$—CH$_2$—CH$_2$—(n=1-12).

This oil may be used individually or, optionally, in admixture with lubricants known per se.

Practical tests with this oil have shown that it has advantages both in the production of low-temperature lubricants and in the production of greases in accordance with DE-OS 1 769 094. However, this low-temperature lubricant has a low initial viscosity which makes it unsuitable for certain applications. It has in fact been found that lubricating oils which should preferably lie in the ISO VG 46 viscosity class are required, i.e. the lubricating oils must have kinematic viscosities of 41.4 to 50.6 mm$^2$/sec at 40° C.

BRIEF DESCRIPTION OF THE INVENTION

The present invention relates to a lubricant based on fluorosiloxanes which is characterized in that it consists of compounds corresponding to the following general formula $$T_aM_bD^F_cD_d$$

in which

T represents phenyl trisiloxy groups, optionally in admixture with alkyl trisiloxy groups, M represents trialkyl monosiloxy groups and/or triphenyl monosiloxy groups, more especially trimethyl siloxy groups, D represents dialkyl disiloxy groups and/or diphenyl and/or methyl phenyl disiloxy groups, more especially dimethyl disiloxy groups and $D^F$ represents alkyl or aryl disiloxy groups, more especially methyl or phenyl disiloxy groups containing a fluorinated group $C_nF_{2n+1}$—CH$_2$—CH$_2$— (n=1-12) and a may assume a value of 0-5, b may assume a value of 3-7, c may assume a value of 3-7 and d may assume a value of 30-70.

DETAILED DESCRIPTION

It has been discovered that certain fluorine-containing organopolysiloxanes are exceedingly useful as low-temperature lubricating oils. Such compounds have the formula $$T_aM_bD^F_cD_d$$

wherein

T represents phenyl trisiloxy groups of mixed phenyl trisiloxy- and alkyl trisiloxy groups;

M represents trialkyl monosiloxy groups triphenyl monosiloxy groups of tri-alkyl/phenol-monosiloxy groups;

D represents dialkyl disiloxy groups, diphenyl disiloxy grops, or phenyl-alkyl disiloxy groups and;

$D^F$ represents disiloxy groups with a methyl or phenyl substituent and a fluorinated substituent of the formula $C_nF_{2n+1}$—CH$_2$—CH$_2$—;

a is a number from 0 to 5;

b is a number from 3 to 7;

c is a number from 3 to 7;

d is a number from 30 to 70; and n is a number from 1 to 12.

It has been found that compounds corresponding to the general formula $$T_aM_bD^F_cD_d$$

in which

T represents a

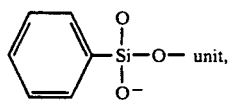 unit,

M represents:

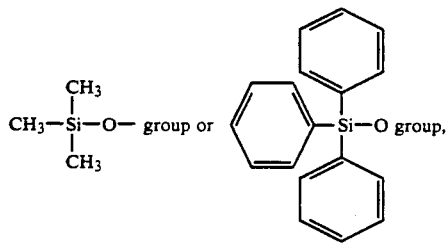

or a siloxy group having one methyl and two phenyl substituents or one phenyl and two methyl substituents, D represents:

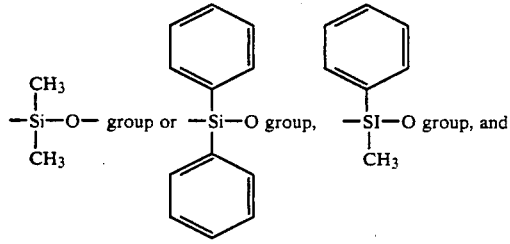

$D^F$ represents:

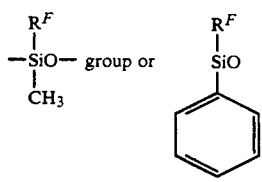

afford particular advantages when
a is preferably about 3,
b is preferably about 5,
c is preferably about 5 and
d is preferably about 50.

The substance in question is a linear or slightly branched silicone oil having all the advantages of silicones, i.e. high temperature stability, minimal dependence of viscosity on temperature, physiological acceptability. By virtue of the $R^F$ groups, which may be $-CH_2-CH_2\ C_nF_{2n+1}$ and in which n may assume values of 1 to 12 and, in certain cases, even higher values, this oil shows outstanding solubility in refrigerants (for example in R 12, R 13, R 502 or R 503).

Thus, it was not possible with these refrigerants to find any miscibility gaps with the refrigerants, even at low temperatures of down to $-110°$ C. The low-temperature flow resistance in a U-tube according to DIN 51 568 is below $-80°$ C. The solidification point according to DIN 430 3016 is $-92°$ C. and is sufficient to remain liquid under refrigerant vapor pressure with small quantities of liquid refrigerant, even at temperatures of $-110°$ C.

The lubricating properties of these oils are eminently suitable for refrigeration compressors. Determination of compressive strength in a four-ball apparatus (DIN 51 350) showed a welding force of 1800N.

Testing of the lubricating properties in the Almen Wieland test showed a welding force of 6500 to 8000N at the load limit and a friction force of 2000 to 3000N at a temperature of 69° C.

The Reichert wear test under a load of 15N showed a wear mark of 12 to 14 mm² and a specific load absorbing capacity of 23N/mm².

The viscosity index (ISO 2909) of 350 appears particularly interesting. The water content (DIN 51 777) is below 30 ppm. Further advantages worth mentioning include resistance to hydrolysis, temperature and ageing,
non-corrosive behavior,
foam-inhibiting properties,
non-sludge-forming,
no swelling of sealing material (excluding silicone seals).

As this example of the tested properties of the oils characterized above has surprisingly shown, the lubricants mentioned are eminently suitable for the desired purpose. They show only minimal dependence of viscosity on temperature and have a very low solidification point for excellent lubricating properties. The requirement of high solubility in refrigerants which any low-temperature lubricant has to satisfy is also fulfilled by the lubricants according to the invention.

The lubricants according to the invention are produced in known manner by the addition of fluoroalkenes onto Si—H-containing chlorosilanes, separation of the fluoroalkyl-substituted silanes formed, hydrolysis of corresponding quantities of fluoroalkyl-substituted silanes with a mixture of corresponding quantities (depending on the desired values for a, b, c and d) of, for example, phenyl trichlorosilane, trimethyl monochlorosilane and dimethyl dichlorosilane or phenyl dichlorosilane in a suitable inert solvent, preferably toluene.

This is followed by equilibration with strong equilibration catalysts such as, for example, sulfuric acid to obtain a narrow molecular weight distribution. The end product is neutralized (preferably with soda), thoroughly heated in vacuo and filtered.

The invention is illustrated by the following Example.

EXAMPLE

A mixture of 1.47 kg trimethyl monochlorosilane, 1 kg diphenyl dichlorosilane, 16.47 kg dimethyl dichlorosilane, 1.21 kg phenyl trichlorosilane and 6.22 kg $C_6F_{13}(CH_2)_2\ Si(CH_3)Cl_2$ (99%) is gradually added with vigorous stirring to 60 liters water at a temperature of 35° C. The temperature is kept low (below 35° C.) by intensive cooling, optionally with ice water. After the addition, the mixture is stirred for 1.5 hours and 6 liters toluene are added to improve phase separation.

The lower phase is separated off, the solvent-containing siloxane phase is washed twice with fresh water while stirring for 15 minutes. The solvent is removed as distillate by heating to 50° C.

25 ml concentrated $H_2SO_4$ are added to the siloxane phase which is then condensed at 50°–60° C./40 mbar.

The water accumulating is then distilled off over a period of 2 hours.

The $H_2SO_4$ is removed by addition of water and the product is washed twice. 110 g ZnO are then added, followed by stirring for 1 hour. The ZnO and the acids reacted with it are then filtered off under pressure using filter aids. The oil obtained is heated at 150° C./1 mbar. The product is adjusted to a viscosity of 40–50 mm²/sec (at 40° C.) with batches of higher or lower viscosity.

The product has substantially the following composition $$T_3M_5D^F{}_5D_{50}$$

the refractive index is 1.39 and the viscosity index approximately 350; the other properties also correspond to the cited specifications.

What is claimed is:

1. Fluorosiloxane/lubricants which consist of compounds corresponding to the formula $$T_aM_bD^F{}_cD_d$$

wherein
- T represents phenyl trisiloxy groups or mixed phenyl trisiloxy-and alkyl trisiloxy groups;
- M represents trialkyl monosiloxy groups, triphenyl monosiloxy groups or tri-alkyl/phenyl-monosiloxy groups;
- D represents dialkyl disiloxy groups, diphenyl disiloxy groups, or phenyl-alkyl disiloxy groups and;
- $D^F$ represents disiloxy groups with a methyl or phenyl substituent and a fluorinated substituent of the formula $C_nF_{2n+1}$—$CH_2$—$CH_2$—;
- a is a number from 1 to 5;
- b is a number from 3 to 7;
- c is a number from 3 to 7;
- d is a number from 30 to 70; and
- n is a number from 1 to 12.

2. Lubricant as claimed in claim 1 wherein
- a is approximately 3,
- b is approximately 5,
- c is approximately 5 and
- d is approximately 50.

3. Lubricant as claimed in claim 1 wherein
- T represents phenyl trisiloxy groups;
- M represents trimethyl siloxy groups; and
- D represents dimethyl disiloxy groups.

4. Fluorosiloxane lubricants which consist of compounds of the formula $$T_aM_bD^F{}_cD_d$$

wherein
- $T_a$ is about three phenyl trisiloxy groups;
- $M_b$ is about five trimethyl-siloxy groups, triphenylsiloxy groups, mono-methyl, diphenyl-siloxy groups or dimethyl-phenyl-siloxy groups;
- $D_d$ is about fifty dimethyl-disiloxy groups, diphenyl-disiloxy groups or methyl-phenyl-disiloxy groups; and
- $D^F{}_c$ is about five units of the formula

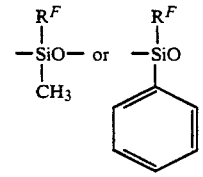

wherein $R^F$ is —$CH_2$—$CH_2$—$C_nF_{2n+1}$ and n is a number from 1 to 12.

5. Lubricant according to claim 4 wherein
- T represents phenyl trisiloxy groups;
- M represents trimethyl siloxy groups; and
- D represents dimethyl disiloxy groups.

* * * * *